United States Patent [19]
Fedder

[11] 3,970,379
[45] July 20, 1976

[54] ANIMATION METHOD AND SYSTEM

[76] Inventor: Tobe T. Fedder, 3531 85 St., Jackson Heights, Queens, N.Y. 11372

[22] Filed: July 2, 1974

[21] Appl. No.: 485,212

[52] U.S. Cl. .................................. 352/52; 352/50; 352/54; 352/87
[51] Int. Cl.² ...................................... G03B 19/18
[58] Field of Search .................. 352/50, 51, 54, 87, 352/52, 53; 353/11, 40, 41; 33/1 G, 1 F

[56] References Cited
UNITED STATES PATENTS

| | | | |
|---|---|---|---|
| 1,275,496 | 8/1918 | Taylor et al. | 352/87 |
| 2,054,414 | 9/1936 | Fleischer | 352/52 |
| 3,171,204 | 3/1965 | Balducci | 33/1 G |
| 3,556,646 | 1/1971 | Guidi et al. | 352/52 |

FOREIGN PATENTS OR APPLICATIONS

| | | | |
|---|---|---|---|
| 25,439 | 11/1935 | Australia | 352/52 |
| 1,310,463 | 10/1962 | France | 352/87 |
| 978,040 | 12/1964 | United Kingdom | 352/54 |

Primary Examiner—L. T. Hix
Assistant Examiner—Russell E. Adams, Jr.
Attorney, Agent, or Firm—Hubbell, Cohen, Stiefel & Gross

[57] ABSTRACT

A system and method for producing an animated motion picture in which the scene contents for the next succeeding frame in a plurality of sequential picture frames may be aligned with respect to the previous frame scene content prior to the photographic recording of the next succeeding frame utilizing a scene registration layout transparency projection having indicia thereon indicating each of the positions of at least the character objects and the scenic objects for each of the frame contents comprising the animated motion picture scene to provide a projection of the complete scene layout and sequential character object movement for a predetermined animated motion picture scene format. The scene registration layout projection is projected onto the stage upon which the scene is to occur between the photographic recording of each of the frames. The character objects utilizable in this system comprise at least substantially two dimensional character objects, such as cartoon characters, which are three dimensionally variable in position and which may be photographed in a single exposure with real three dimensional objects. The sequential frames are photographed with a camera through a movable platen which enables the provison of special visual effects in the resulting animated motion picture.

14 Claims, 9 Drawing Figures

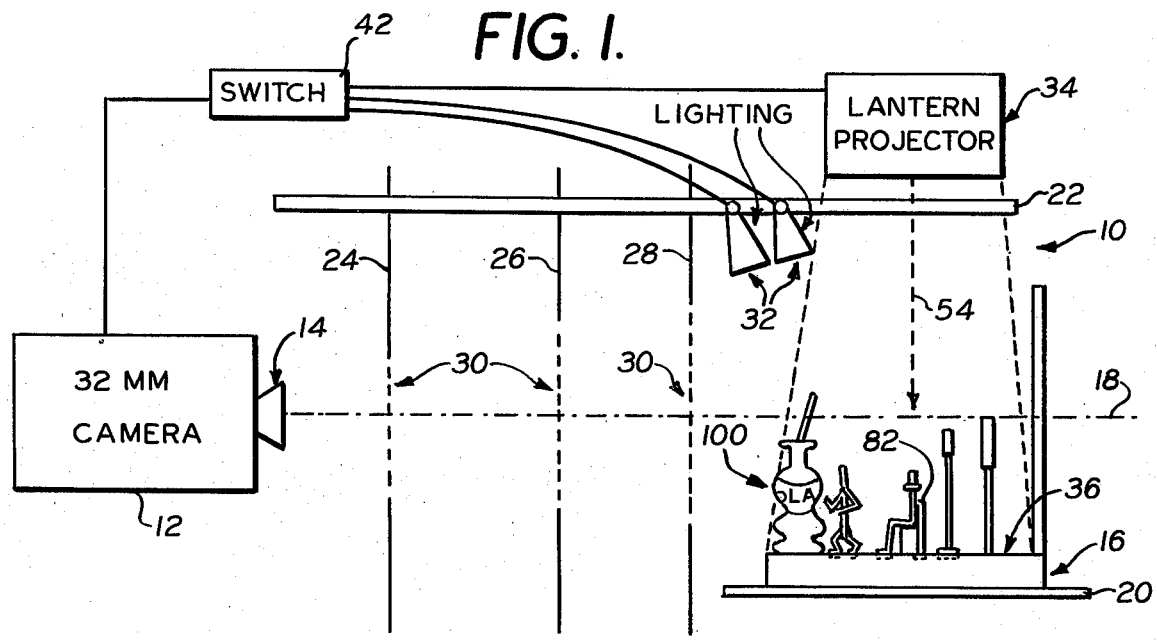
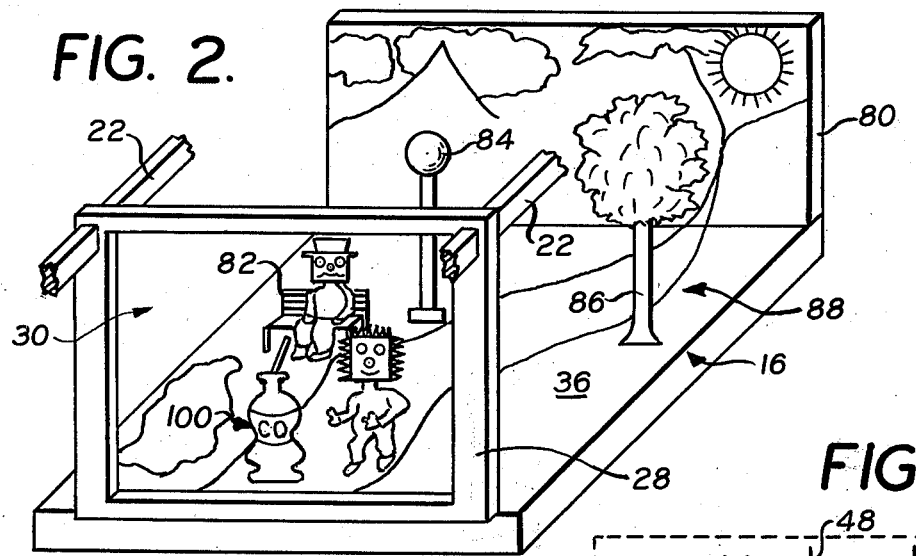
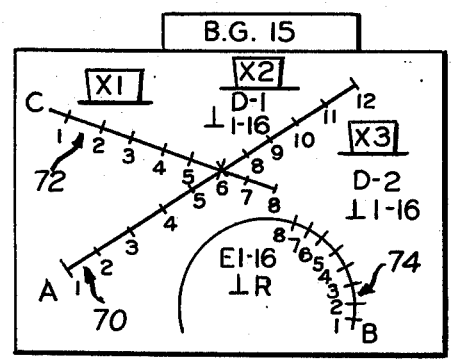

ANIMATION METHOD AND SYSTEM

BACKGROUND OF THE INVENTION

1. Field of the Invention

The present invention relates to a method and apparatus for producing an animated motion picture by photographically recording a plurality of sequential picture frames comprising a scene of the animated motion picture.

2. Description of the Prior Art

There are several well known techniques for producing animated motion pictures such as by conventional animation wherein an artist lays out a scene and physically draws each of the sequential frames in the scene to produce what is commonly termed a cartoon or animation when the various sequential frames are projected at a predetermined play back rate. More recently, various techniques for photographically producing animation have been utilized to provide an illusion of movement in three planes of space utilizing, by way of example, a single sequence of animated images. Such an arrangement is disclosed in U.S. Pat. No. 3,556,646 which utilizes transparent supporting members for supporting two dimensional images from a jig at different positions for photographing where the illusion of movement in depth is generated by varying the distance from the image to the camera lens from frame to frame while maintaining the same relative size of like images from frame to frame. However, this technique initially requires the preparation of drawings representing each of the positions of the image in the sequence or cycle as well as the use of a double exposure for each frame to produce the illusion of movement. Furthermore, this technique is not satisfactory when it is desired to combine real three dimensional objects, such as in promotional advertising, with substantially two dimensional characters, such as cartoon characters, without utilization of a more costly double exposure whose illusory effects may not be as desirable as that producible from a single exposure integrally relating the cartoon character and the real three dimensional object.

In addition, some prior art techniques have utilized superposition of various transparencies to produce the resultant image, such as disclosed in U.S. Pat. No. 2,351,634 or, in an attempt to produce a three dimensional like animation, some prior art techniques have attempted to use multilevel shots to show depth comprising a plurality of transparencies stacked one on top of the other which are then photographically recorded. However, the scene contents or the figures by way of example cannot realistically move from level to level in the multilevel shot to provide a realistic three dimensional animation. Furthermore, once again, such a technique does not lend itself to the combination of real three dimensional objects with two dimensional cartoon objects in a single exposure. Some prior art techniques, such as what is commonly known as stop motion animation, have utilized three dimensional figures which are moved physically through various increments which may be combined with three dimensional packages or other articles to be advertised. However, such techniques do not utilize a projectable scene registration layout and considerable problems of registration occur in adjusting for the several incremental frames being recorded to comprise a scene. Some of these prior art techniques which produce animated motion pictures utilizing puppets by way of example and three dimensional props do, however, mark the registration of objects for each exposure. However, such markings are not projectable so as to project the layout of a complete scene format to provide the animated motion scene comprising a plurality of frames and all the associated incremental movements onto the stage before the photographing of each sequential frame. Prior art techniques which do employ projected grids for use in producing animated motion pictures, such as the type disclosed in U.S. Pat. No. 2,599,624, which is the type utilized with coordinating the positions of a puppet with a previously filmed action sequence of a live actor, does not project a complete scene layout registration containing all of the incremental movements necessary for the plurality of frames comprising the scene. What is projected is merely an alignment grid. The utilization or projection of an alignment grid which is merely a series of squares is well known, such as disclosed, in addition, in U.S. Pat. No. 2,358,530; however, such a projection is not satisfactory for facilitating the shooting of an entire animated motion picture scene, particularly if such a scene is to be a realistic three dimensional scene comprising several movable two dimensional characters which are three dimensionally movable in the animated motion picture scene. Other prior art animation techniques which have not proven completely satisfactory because of various limitations in these techniques which prevent efficient utilization in providing three dimensional animation motion pictures are such as the type disclosed in U.S. Pat. Nos. 1,380,298; 2,201,649; 2,327,059; 2,358,530; 3,233,509; 3,256,773 and 3,288,548, in addition to the various patents discussed, by way of example, above. These disadvantages of the prior art are overcome by the present invention.

SUMMARY OF THE INVENTION

A method and system for producing an animated motion picture comprising photographic means for photographically recording a plurality of sequential picture frames comprising a scene of the animated motion picture is provided whereby the scene contents of the next succeeding frame in the plurality of sequential picture frames may be aligned with respect to the previous frame scene content prior to the photographic recording of the next succeeding frame through the use of a scene registration layout transparency projection having indicia thereon indicating each of the positions of at least the character objects and the scenic objects for each of the frame scene contents comprising the animated motion picture scene to provide a projection of the complete scene layout and sequential character object movement for a predetermined animated motion picture scene format. The system utilizes a stage in optical alignment with the photographic means, such as a movable stage platform, with the photographic means photographically recording the scene content of the stage for each picture frame comprising the scene. The stage scene content sequentially varies for each frame in accordance with the predetermined animated motion picture scene formed to provide the animated motion picture scene, the scene content comprising background means, set objects and character objects, such as substantially two dimensional cartoon characters, for each of the frame scene contents. The background means, set objects and character objects have a predetermined position on the stage for each given frame scene content, each of the positions being determined in accordance with the predetermined format. At least the character objects are three dimensionally sequentially variable in position with respect to the photographic means for each of the frame scene contents. Means, such as a conventional lantern projector are provided for projecting the scene registration layout transparency projection onto the stage between the photographic recording of each of the frames. A movable platen may be interposed between the photographic means or camera and the stage in optical alignment therewith along an optical axis with the platen having an aperture therein for framing the scene content of the stage along the optical axis and the scene content being photographically recorded through the platen aperture, which platen is movable both horizontally and vertically with respect to the optical axis. The platen aperture preferably comprises substantially transparent means therein for enabling the scene content to be photographically recorded therethrough, the movable platen enabling at least a predetermined one of the character objects to be adherable thereto as the platen is sequentially moved to a different position with respect to the optical axis for a given frame for providing a predetermined three dimensional visual effect in the animated motion picture scene, such as a bball rolling off a table. The stage surface preferably comprises a magnetic surface upon which the scene contents are placed with each of the character objects comprising a magnetic means, such as a magnetic base, for magnetically removably holding the character objects in the predetermined incremental positions for a given frame scene content in each of the plurality of frames. The scene layout registration projection is projected onto the stage only between the photographic recording of each of the frames. If desired, a plurality of movable platens may be utilized to provide varying visual effects. Thus, through single exposures, animated motion picture scenes having real three dimensional objects combined with two dimensional cartoon objects which are three dimensionally variable in position so as to produce a realistic three dimensional animation, may be provided.

BRIEF DESCRIPTION OF DRAWINGS

FIG. 1 is a diagrammatic illustration of the animated motion picture production system of the present invention;

FIG. 2 is a fragmentary perspective view of the stage portion of the present invention illustrated in FIG. 1;

FIG. 3 is a diagrammatic illustration of a typical scene layout registration transparency utilizable with the system of FIG. 1;

FIG. 4 is a diagrammatic illustration of a typical transparency projector of the type utilizable with the system of FIG. 1;

FIGS. 5A and 5B are a schematic of a typical control circuit, in two different operating states, for the registration layout projection utilizable in the system of FIG. 1;

DETAILED DESCRIPTION OF THE PREFERRED EMBODIMENTS

Figure 6:
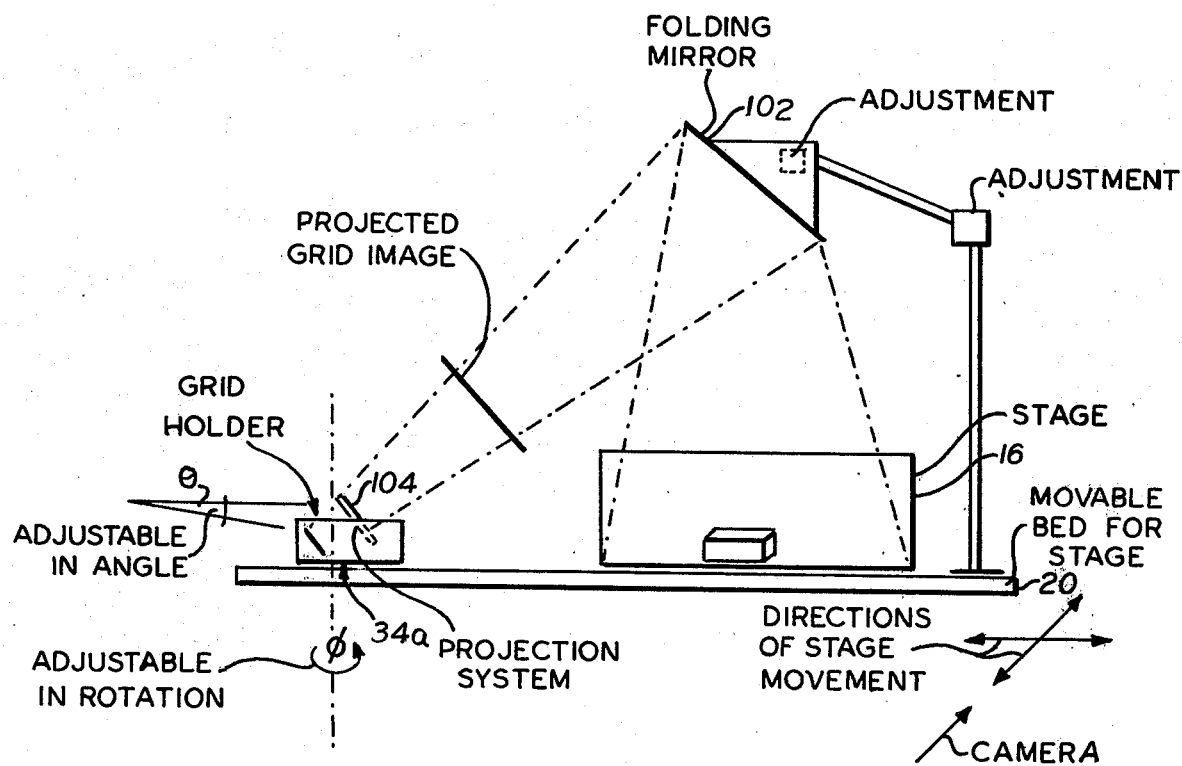
FIG. 6 is a diagrammatic illustration of an alternative embodiment of the registration layout projection portion of the system of FIG. 1.

Referring now to the drawings in detail and initially to FIG. 1 thereof, the preferred system, generally referred to by the reference numeral 10, for producing an animated motion picture preferably of the type capable of providing a three dimensional visual effect from substantially two dimensional figures, such as cartoon characters, as well as being capable of combining such substantially two dimensional cartoon type of characters or objects with real three dimensional objects is shown. The system 10 preferably includes a conventional slide camera, such as a 32 millimeter or 35 millimeter camera 12 preferably having a plurality of interchangeable lenses 14 to produce different visual effects, such as changes in depth of field, a plurality of variable f stop positions for producing different visual effects, and a plurality of variable film speed settings for producing different visual effects. A typical such camera is the ARRIFLEX manufactured by ARRIFLEX CORP. A stage 16 is also preferably provided, the stage being located in optical alignment with the camera 12 with respect to an optical axis 18. As will be described in greater detail hereinafter, it is the stage contents 16 which are photographed by the camera 12 to provide the sequential picture frames comprising a scene of an animated motion picture. The stage 16 is preferably mounted on a movable bed 20 in conventional fashion for movement toward and away from the camera 12 in a direction parallel to the optical axis 18 as well as movement to the left and right of the camera along a plane parallel to a plane perpendicular to the optical axis 18 to vary the visual effects produced by the camera 12. system 10 also preferably includes a jig arrangement 22 which is conventional in structure and comprises a plurality of movable racks which are movable in conventional fashion by a conventional gearing arrangement (not shown) and preferably contains a plurality of movable platens, three such platenns 24, 26 and 28 being shown by way of example in FIG. 1. Each of these platens 24, 26 and 28 preferably act as frames for the scene being photographically recorded on the stage 16, as illustrated in FIG. 2 where platen 28 is shown by way of example. The platen 28 preferably contains a transparent central portion 30 so that the scene may be photographed by the camera 12 therethrough and, most preferably, consists of a transparent sheet material such as glass or lucite to which objects may be adhered for producing special visual effects as will be described in greater detail hereinafter. The jig 22 also preferably contains conventional stage lighting 32, such as MINI-MOLES, for illuminating the stage 16 when a scene is to be photographically recorded thereon by camera 12.

In addition, a conventional transparency projector, such as a conventional lantern projector 34, such as the type illustrated in greater detail in FIG. 4, is provided in optical registration with the stage 16 so as to project a transparency inserted therein on to the stage 16 to preferably cover the entire stage floor 36. As will be described in greater detail hereinafter, what is preferably projected by projector 34 onto the stage floor 36 is a scene registration layout transparency projection, such as the typical projectible scene registration layout transparency 40 illustrated by way of example in FIG. 3, which is a complete scene layout illustrating sequential character object movement for the entire scene for a predetermined animated motion picture scene format as well as indicating each of the positions of the scenic or set objects for each of the frame scene contents comprising the animated motion picture scene being sequentially photographically recorded by camera 12 and, in addition, preferably also includes background information. Thus, as will be described in greater detail hereinafter, when this scene registration layout projection is projected onto the stage floor 36 by projector 34, each of the positions of the character objects and the scenic objects for each of the frames comprising the scene as well as the background information are displayed for use by the photographer. In addition, as shown and preferred in FIGS. 1 and 5, and as will be described in greater detail hereinafter, the projector 34 is connected so as to only project the scene layout registration transparency 40 onto the stage floor 36 when the camera 12 is off, such as when the camera shutter is in the closed position. This is accomplished, preferably, as will be described in greater detail, by interlocking the projector 34 with the camera 12 and the lighting 32 through a conventional switching arrangement 42 shown in greater detail in FIGS. 5A and 5B.

Referring now to FIGS. 4 and 5A and 5B, and initially to FIG. 4 the projector 34 preferably includes a conventional light source 44 positioned between a concave mirror 46 and a heat resistent glass plate 48. A conventional condensor lens arrangement 50 is preferably positioned between the transparency 40 to be projected and the heat resistent glass plate 48. A conventional projection lens 52 is also provided for projecting the transparency 40 when the light source 44 is illuminated, all of the elements being aligned along optical axis 54. The operation of the projector 34 to project the transparency is conventional, only the optical system thereof being illustrated in FIG. 4 by way of example. Suffice it to say that the condensor 50 collects light from the light source 44 and forms an enlarged image of the transparency 40 just filling the aperture of the lens 52 which then produces an image of the transparency 40 on the stage floor 36 to cover the area of the stage floor. Referring now to FIGS. 5A and 5B, when the camera switch 42 is closed, this powers a conventional solenoid 60 which in turn opens a normally closed contact 62 and closes a normally open switch contact 64, the circuit resembling the arrangement illustrated in FIG. 5B at this point. When switch 62 open, no power is provided to the light source 44, which is the condition illustrated in FIG. 5B. When the camera switch 42 is reclosed, switch 64 opens turning off the lights 32 and switch 62 closes turning on the projector light source 44, which is the condition illustrated in FIG. 5A.

Referring now to FIG. 3, the scene registration layout projection 40 is preferably a transparency of conventional transparent sheet material and may be made in conventional fashion such as by plotting desired incremental movements of the character objects, by way of example, or any other incremental movements on a pure white surface which duplicates the size and configuration of the shooting surface or stage floor 36. A transparent primary overlay such as one which is translucent gray, is preferably then placed over this pure white surface under a secondary transparent overlay upon which incremental movements and registration marks for the various character objects, scenic objects and background to be employed in the entire animated motion picture scene are indicated, such as preferably in opaque black. As shown and preferred in FIG. 3 by way of example, numerical designations corresponding to the layout designations are preferably marked on the transparent overlay 40 identifying these movements. Additionally, as is also shown and preferred in FIG. 3, all set pieces or objects, props, background and character objects are marked according to the positions which they will occupy on the shooting surface 36. The primary overlay is then preferably removed, leaving the pure white surface under the secondary overlay upon which the opaque black plottings have been drawn. A positive or negative image, depending on preference, is then preferably photographed or recorded by a camera mounted overhead in a rigidly fixed position corresponding to the desired position of the projector 34 for projecting the transparency which only covers the complete area of the stage floor or shooting surface 36.

Referring to FIG. 3, by way of example, the scene registration layout projection transparency 40 illustratively is shown to include a notation corresponding to a specific background indicated as "BG15", a series of notations corresponding to the location of the set pieces or props or set objects for the animated motion picture scene to be photographed and recorded indicated, by way of example, by the notations X1, X2 and X3 on the transparency 40, a pair of intersecting paths 70 and 72 labeled A and C, respectively showing incremental positions 1 through 12 for path 70 and 1 through 8 for path 72, ech of these paths corresponding to a particular designated character and the character's incremental movement in the scene and each of the numbers 1 through 12 for path 70 and 1 through 8 for path 72 corresponding to a different sequential frame in the scene, a curved path 74 labeled B corresponding to the path of incremental movements for the particular designated character for this path and having frame indications 1 through 8 for incremental movement, and designations D-1 D-2 and E with a notation 1 through 16 after each of these numbers indicating that the particular designated characters, by way of example, remain in this horizontal position in the scene for 16 frames. However, it should be noted that each of the designations A1, A2, A3, etc., by way of example, for path 70 indicate a different increemental position of a character. The character itself preferably has had the appropriate portions incrementally advanced, such as the arms moved slightly or the legs moved slightly to indicate movement for each incremental position or frame in the scene. This may be accomplished by having a single character which has its leg and/or arm positions changed incrementally with each scene or may be, preferably, accomplished by having a plurality of identical characters which only differ by such incremental movement location of the arm and/or other appropriate portions, each different incremental designation corresponding to a different frame in the scene, such as a different one for a 1, a different one for a 2, etc. Similarly, for the positions D-1, D-2 and E by way of example, if desired the character may be shown as jumping in place where its vertical position changes in the scene as opposed to its horizontal position. This may be accomplished by utilizing different incremental positions of the character to indicate alterations in its vertical position. Furthermore, if desired, a combination of both horizontal and vertical movement for a character may be accomplished. Thus, substantially two dimensional characters may be moved three dimensionally, both horizontally and vertically, if desired, in a scene and all of these three dimensional movements may be indicated in the scene registration layout projection transparency 40.

It should be noted that FIG. 3 is a plan view of the transparency 40 as it is projected. Thus, as illustrated in FIGS. 1 and 2, BG 15 in the transparency 40 might correspond to the background backdrop 80 for the scene, X1 might correspond to a park bench scenic object 82, X2 might correspond to another scenic object such as a lamppost 84, and X3 could correspond to another scenic object such as a tree 86. Each of these scenic objects 82 through 86 are preferably substantially two dimensional; that is of substantially minimal depth as illustrated in FIGS. 1, 2, 7 and 8.

Figure 7:
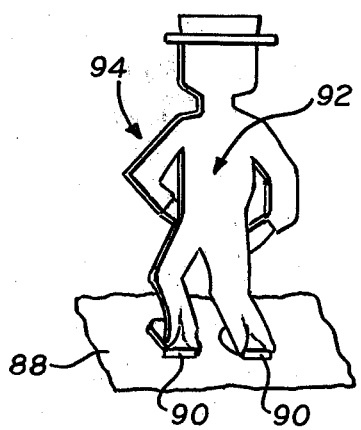
FIG. 7 is a fragmentary rear perspective view of a typical character object utilizable in the system of FIG. 1.
Figure 8:
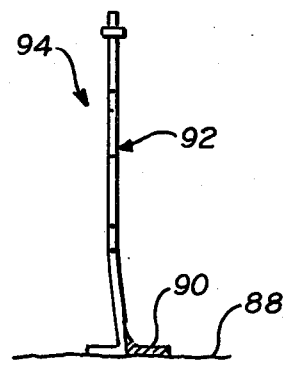
FIG. 8 is a side elevation view of the character object of FIG. 7.

Preferably, the shooting surface 36 contains a flexible magnetic sheet 88 covering the entire surface, such as a sheet of the type manufactured by REGAL & WADE, which is a magnetically permeable material and is flexible so that any desired contour may be provided, such as to represent hills in a scene, the character objects and scenic objects being preferably removably secured to the flexible magnetic sheet 88 covering the shooting surface 36 by means of ferrous triangles 90 (FIGS. 7 and 8) secured to the backs of the objects 92 such as a typical character object 94 shown by way of example in FIGS. 7 and 8. The character objects as well as the props and scenic objects are preferably constructed of a substantially rigid material so as to have structural intergrity, such as polystyrine and the triangles 90 are of sufficient weight and magnetic force so as to hold the character objects and scenic objects in the proper upright position on the shooting surface 36. As is also shown and preferred by way of example in FIGS. 1 and 2, real three dimensional objects, such as a soda bottle 100, by way of example, may be included in the scene with the substantially two dimensional character objects, such as preferably cartoon character objects by way of example, and substantially two dimensional scenic objects so as to provide a realistic three dimensional visual effect utilizing substantially two dimensional characters such as cartoon characters and real three dimensional objects which may be photographically recorded in a single exposure by camera 12 to provide a plurality of sequential frames which result in a predetermined scene of an animated motion picture. In order to produce this scene, the platens 24, 26 and 28 are all preferably movable along the optical axis 18 toward and away from the camera so as to provide different visual effects. For example, if it is desired to produce a three dimensional effect illustrating a ball flying off a table, the platen 28 could be lined up at the edge of the shooting surface 36 so as to have the bottom edge of the transparent portion 30 aligned with the shooting surface 36. The ball would then be adhered to the transparent surface 30 of the platen 28 by way of example and then the platen 28 would be incrementally moved toward the camera along optical axis 18 in a horizontal direction as well as simultaneously being moved vertically away from optical axis 18 so as to provide the illusion of the ball flying toward the camera and continuing upward. With the arrangement illustrated in the figures multilevel animation may readily be accomplished merely by placing the characters in various depth positions in the scene as well as by placing the scenic objects in various depth positions in the scene. It will readily occur to one of ordinary skill in the art the various different visual effects which can be produced by the system and method illustrated in the figures and described herein in producing animated motion pictures in which real three dimensional objects and three dimensionally movable substantially two dimensional objects may be combined in a single exposure, as well as the innumerable possibilities for providing realistic three dimensional animations or cartoons in a simple and efficient manner. For example, as previously mentioned, if it is desired to produce a visual effect with a two dimensional character object, for example such as a skier leaping off a hill, the character object could be adhered to the platen, such as platen 28 which could be vertically and horizontally moved in the fashion previously described with respect to the illustration of the ball flying off the table.

Thus, in employing the method and system 10 of the present invention to provide an animated motion picture, such as a scene thereof, the scene registration layout projection transparency 40 corresponding to the desired scene is projected onto the stage shooting surface 36, the transparency 40, as previously mentioned, having indicia thereon indicating each of the incremental positions of the character objects and the set objects for each of the frame scene contents comprising the animated motion picture scene to provide a projection of the complete scene layout and sequential character object movement for a predetermined scene format for the animated motion picture. The set objects, including the props and set pieces are then placed in position by aligning registration marks, preferably located on the backs of the figures, with the various registration marks indicated on the projected transparency 40 in accordance with the particular frame being shot and, similarly, the character objects are also so arranged in the proper incremental position with the proper incremental character registered by virtue of its appropriate index mark with the proper indicia in the projected transparency 40 for the given frame being shot for the scene. When the entire scene frame scene contents is in position, such as including the proper location of the real three dimensional object, the proper location of the substantially two dimensional character objects and the substantially two dimensional scenic objects, as well as background for the given frame, the camera switch is closed so as to photograph the frame. This closure of the camera switch, as previously mentioned, turns off lantern projector 34 so that the transparency 40 is no longer projected onto the shooting surface and the frame is photographically recorded. When the shutter closes and the camera switch is reclosed, the projector 34 once again is illuminated so as to project the transparency 40 onto the shooting surface 36 and the photographer then selects new and/or repositions the characters as well as the balance of the objects for the next successive sequential frame to be photographically recorded. This process continues until the entire plurality of sequential frames necessary to provide the animated motion picture scene have been photographically recorded.

Referring now to FIG. 6, if desired, an alternative arrangement may be provided for the lantern projector 34 arrangement for the scene registration layout projection transparency 40 utilizing a conventional folding mirror 102, which is adjustable, as well as an adjustable grid holder 104 for the transparency 40 and projection lens. In this instance the projection system 34a is preferably adjustable for rotation in two planes, the folding mirror 102 being preferably fixed in position on the movable bed 20 for the stage 16 so that the position of all items remains fixed to one another regardless of the position of the movable bed 20 with the camera 12 remaining fixed. Apart from the use of the folding mirror 102 and the angularly adjustable grid holder 104 for the transparency, the operation of the transparency projector 34a, as well as the balance of the system 10, such as the interlock of the projector 34a with the camera 12 and lighting 32 is preferably identical with the previously described with reference to the projector 34 in the arrangement illustrated in FIG. 1 and will not be described in greater detail hereinafter.

Preferably, each scene comprising an animated motion picture has a different associated scene registration layout projection transparency 40, with the transparency 40 containing all of the necessary layout information for the entire scene. If desired, however, a single transparency 40 could be utilized with proper indicia notation to provide layout information for more than one scene.

It is to be understood that the above described embodiments of the invention are merely illustrative of the principles thereof and that numerous modifications and embodiments of the invention may be derived within the spirit and scope thereof.

What is claimed is:

1. A system for producing an animated motion picture comprising photographic means for photographically recording a plurality of sequential picture frames comprising an animation sequence of a scene of said animated motion picture, a shooting surface means in optical alignment with said photographic means, said photographic means photographically recording the animation segment content of said shooting surface means for each picture frame comprising said animated scene sequence, said shooting surface means animation segment content sequentially varying for each frame in accordance with a predetermined animated scene sequence to provide said animated motion picture, said shooting surface means animation segment content comprising background means, set objects and character objects for each of said frame animation segments, said background means, set objects and character objects having a predetermined position on said shooting surface means for each given frame animation segment content, each of said positions being determined in accordance with said predetermined animated scene sequence, at least said character objects being three dimensionally sequentially variable in position with respect to said photographic means for each of said frame animation segments, at least some of said character objects comprising substantially two dimensional cartoon drawings which are three dimensionally variable in position, a scene registration layout projection having indicia thereon indicating each of the positions of at least said character objects and said scenic objects for all of said frame animation segments comprising said animated motion picture animation sequence to provide a projection of the complete scene layout and sequential character object movement for said predetermined animated motion picture animated scene sequence, and means for projecting said scene registration layout projection on to said shooting surface means only when said frame animation segment is not being photographically recorded, whereby the animation segment content for the next succeeding frame in said plurality of sequential picture frames comprising said animated scene sequence may be aligned with respect to the previous frame animation segment in said sequence prior to the photographic recording of said next succeeding frame animation segment and said registration layout for said sequence will be absent from each photographically recorded segment of said sequence.

2. A system in accordance with claim 1 wherein said photographic means comprises a shutter means having an open position and a closed position, said frame being photographically recorded when said shutter means is in said open position, said scene registration layout projection means comprising means operatively connected to said photographic means shutter means and responsive to the position thereof for projecting said scene layout registration projection only when said shutter means is in said closed position.

3. A system in accordance with claim 1 further comprising a movable platen means interposed between said photographic means and said shooting surface means in optical alignment therewith along an optical axis, said platen means having an aperture therein for framing the animation segment content of said shooting surface means along said optical axis, said animation segment content being photographically recorded through said platen means aperture.

4. A system in accordance with claim 3 wherein said platen means is movable both horizontally and vertically with respect to said optical axis.

5. A system in accordance with claim 4 wherein said platen means aperture comprises substantially transparent means therein for enabling said animation segment content to be photographically recorded therethrough, said movable platen means enabling at least a predetermined one of said character objects to be adhearable thereto as said platen is sequentially moved to a different position with respect to said optical axis for a given frame for providing a predetermined three dimensional visual effect in said animated motion picture animation segment.

6. A system in accordance with claim 1 wherein said character objects further comprise at least one real three-dimensional object, whereby cartoon characters and real three-dimensional objects may be combined in a frame animation segment with a single exposure of said photographic means.

7. A system in accordance with claim 1 wherein said shooting surface means comprises a magnetic surface upon which said animation segment contents are placed, each of said character objects comprising magnetic means for magnetically removably holding said character objects in said predetermined incremental position for a given frame animation segment in each of said plurality of frames comprising said animated motion picture animated scene sequence.

8. A method for producing an animation sequence of a scene of an animated motion picture comprising a plurality of sequential picture frames, each frame having a different animation segment of said animation sequence, said method comprising the steps of providing set objects and character objects comprising a three dimensional scene and a shooting surface upon which said three dimensional scene capable of having character objects and set objects therein is to be provided from said set and character objects mounted thereon, said provided character objects comprising at least substantially two dimensional cartoon drawings which are three dimensionally variable in position, projecting a scene animation sequence registration layout projection on to said shooting surface having indicia thereon indicating each of the positions of said character objects and said set objects for all of the frame animation segments of said animation sequence comprising said animated motion picture scene for providing a projection of the complete animated scene layout and sequential character object movement for a predetermined animated scene sequence for said animated motion picture, each of said set objects and said character objects having a predetermined position on the shooting surface for each given frame animation segment, each of said positions being determined in accordance with said projected predetermined animated scene sequence, sequentially three dimensionally varying at least said character objects in position for each of said frame animation segments in accordance with said projected predetermined animated scene sequence and photographically sequentially recording the scene contents of said shooting surface for providing said plurality of sequential picture frames comprising said animation sequence, said set objects and character objects being registered for each frame animation segment in accordance with said projected animated scene sequence registration layout projection, said registration layout projection being projectable on to said shooting surface only when said frame animation segment is not being photographically recorded, whereby the animation segment for the next succeeding frame in said plurality of sequential picture frames comprising said animated scene sequence may be aligned with respect to the previous frame animation segment in said sequence prior to the photographic recording of said next succeeding frame animation segment and said registration layout for said sequence will be absent from each photographically recorded segment of said sequence.

9. A method in accordance with claim 8 wherein said photographic recording step further comprises the step of photographically sequentially recording said frame animation segments through a movable platen means in optical alignment with said shooting surface for variably framing the animation segment content of the frame.

10. A method in accordance with claim 9 wherein said photographic recording step further comprises the step of moving said platen means horizontally and vertically for variably framing the scene content of the frame.

11. A method in accordance with claim 9 wherein said photographic recording step further comprises simultaneously moving at least one character object with said platen means for providing a predetermined sequential three dimensional visual effect in said animated motion picture animated scene sequence.

12. A method in accordance with claim 9 wherein said photographic recording step further comprises simultaneously moving at least one set object with said platen means for providing a predetermined sequential three dimensional visual effect in said animated motion picture animated scene sequence.

13. A method in accordance with claim 8 wherein said photographic recording step further comprises the step of photographically sequentially recording said frame animation segments through a plurality of movable platens in optical alignment with said shooting surface for variably framing the animation segment content of the frame.

14. A method in accordance with claim 8 wherein said character object providing step comprises the further step of additionally providing at least one three dimensional object in said animated scene sequence and said photographic recording step comprises photographically simultaneously recording said real three dimensional object and said cartoon character objects in a single exposure for each frame animation segment comprising said animated scene sequence.

* * * * *